United States Patent [19]

Cranshaw et al.

[11] Patent Number: 5,191,461
[45] Date of Patent: Mar. 2, 1993

[54] INFRARED NETWORK TRANSCEIVER APPARATUS

[75] Inventors: Charles L. Cranshaw, Monte Sereno; John Piccone, San Jose; Richard C. Allen, Los Gatos; James E. Sacherman; John W. Toor, both of Palo Alto, all of Calif.

[73] Assignee: Photonics Corporation, San Jose, Calif.

[21] Appl. No.: 702,448

[22] Filed: May 16, 1991

Related U.S. Application Data

[63] Continuation of Ser. No. 271,570, Nov. 14, 1988, abandoned.

[51] Int. Cl.$^5$ ............................................. H04B 10/00
[52] U.S. Cl. .................................... 359/154; 359/152
[58] Field of Search .................................. 455/603-604, 455/606-607, 613, 617, 618; 362/227, 234, 252, 296, 301; 359/154, 152, 142, 159, 169, 170, 172, 833, 118; 250/552

[56] References Cited

U.S. PATENT DOCUMENTS

| | | | |
|---|---|---|---|
| 4,402,090 | 8/1983 | Gfeller et al. | 455/601 |
| 4,540,605 | 9/1985 | Barone | 427/243 |
| 4,596,050 | 6/1986 | Rogers | 455/607 |
| 4,627,106 | 12/1986 | Drake | 455/617 |
| 4,709,412 | 11/1987 | Seymour | 455/603 |
| 4,723,314 | 2/1988 | Schneeberger | 455/619 |
| 4,763,291 | 8/1988 | Schwaber | 364/704 |
| 4,809,257 | 2/1989 | Gantenbein et al. | 455/607 |

FOREIGN PATENT DOCUMENTS

| | | | |
|---|---|---|---|
| 56-202266 | 12/1981 | Japan . | |
| 57-188975 | 10/1982 | Japan . | |
| 0000235 | 1/1984 | Japan | 455/617 |
| 59-142272 | 6/1984 | Japan . | |
| 0180230 | 9/1985 | Japan | 455/618 |

OTHER PUBLICATIONS

F. R. Gfeller, Group Encoding Method For Infrared Communication, IBM Technical Disclosure Bulletin, vol. 28, No. 10, Mar. 1986, pp. 4440 and 4441.
F. R. Gefeller, Asynchronous Communication Link for Infrared Transmission, IBM Technical Disclosure Bulletin, vol. 28, No. 9, Feb. 1986, pp. 4083-4085.
F. R. Gfeller, Touchpad Cable Function, IBM Technical Disclosure Bulletin, vol. 28, No. 9, Feb. 1986, pp. 4089 and 4090.
F. R. Gfeller and E. Mumprecht, Minicomputer System Components Interconnected Via A Serial Infrared Link, IBM Technical Bulletin, Jan. 1983, vol. 25, No. 8, pp. 4135-4137.
F. R. Gfeller, Proceedings of the 7th European Conference on Optical Communcations, Infrared Microbroadcasting Network For In-House Data Communications, Sep. 11, 1981, pp. 27-1 thru 27-4.
F. R. Gfeller, Proceedings of the IEEE, Wireless In--House Data Communication via Diffuse Infrared Radiation, Nov. 1979, vol. 67, No. 11, pp. 1474-1486.
F. R. Gfeller, H. R. Muller and P. Vettiger, 1978 IEEE, Infrared Communication For In-House Applications, Aug. 1978, pp. 132-138.

*Primary Examiner*—Edward L. Coles, Sr.
*Assistant Examiner*—Kinfe-Michael Negash
*Attorney, Agent, or Firm*—Haverstock, Medlen & Carroll

[57] ABSTRACT

The present invention is for an illumination transmitter. The transmitter projects a signal onto a planar reflective surface such as the ceiling of an open office environment. The transmitter includes a plurality of illumination sources positioned in a line wherein the line has a predetermined orientation to the planar surface. The illumination sources are preferably infrared LEDs. The transmitter has means for jointly aiming the illumination sources toward a desired location on the planar surface. The location on the planar surface is usually used to allow multiple transmitters coupled to infrared receivers to allow communication between computers in a LAN. The transmitter also includes means for maintaining the predetermined orientation between the planar surface and the line. The orientation is usually parallel to allow transmitters located large distances from the illumination to project a relatively small illumination spot onto the planar surface.

9 Claims, 3 Drawing Sheets

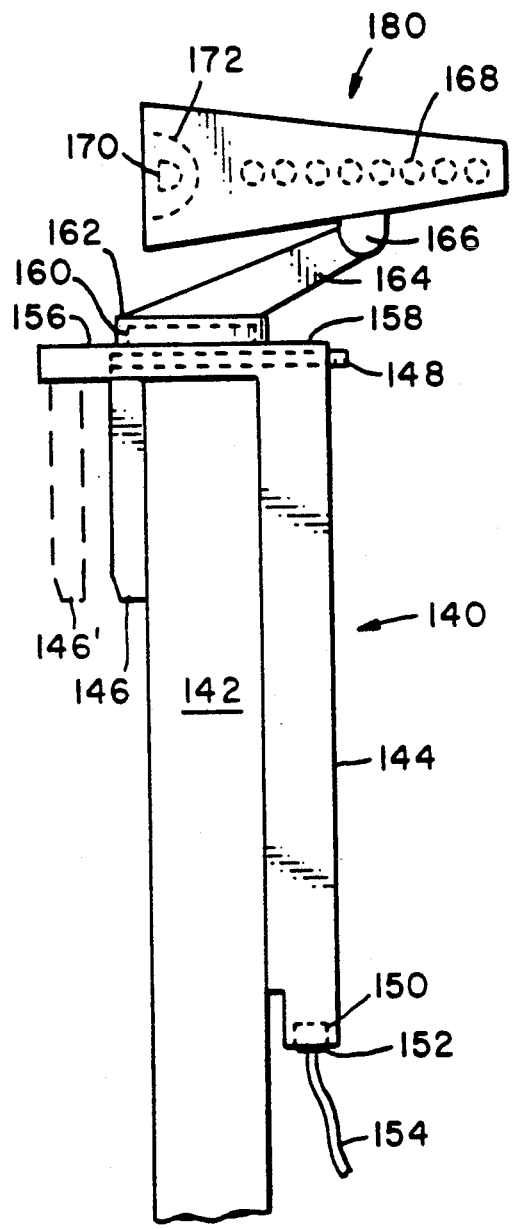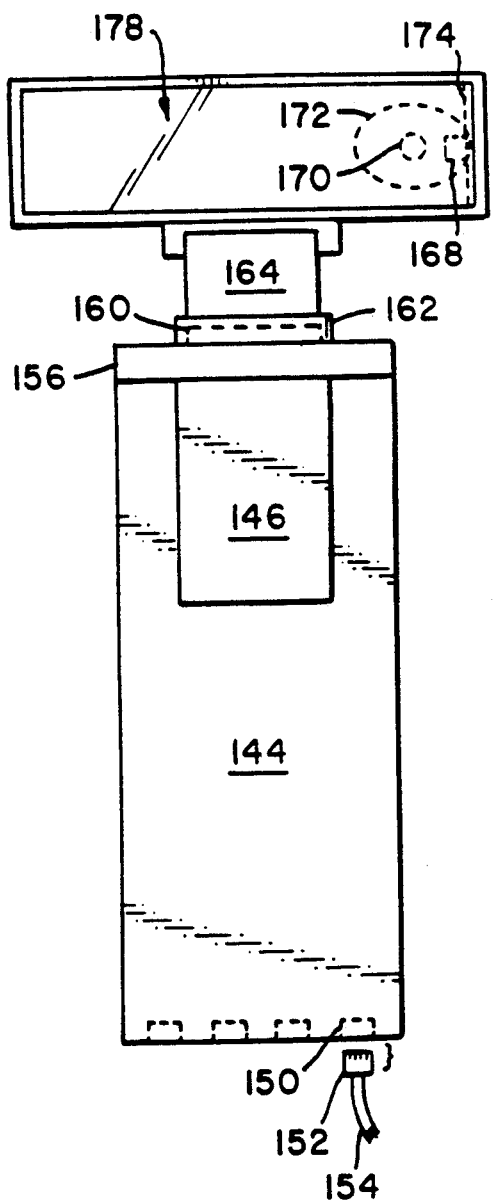
FIG. 3
FIG. 4

INFRARED NETWORK TRANSCEIVER APPARATUS

This is a continuation of co-pending application Ser. No. 07/271,570 filed on Nov. 14, 1988.

FIELD OF THE INVENTION

This invention relates to the field of data communication. More particularly, this invention relates to data communication by means of infrared transmission.

BACKGROUND OF THE INVENTION

In the field of wireless data communication the transmission media includes electromagnetic radiation transmission in the radar, radio and microwave frequency ranges. The transmitting and receiving apparatus typically include dish or dipole type antennae.

Wireless data transmission using reflected infrared radiation is disclosed in our copending U.S. patent application Ser. No. 184,261. It is preferable that inexpensive commercially available infrared LEDs be used as the transmission source for the infrared radiation. However, the intensity of such LEDs is generally insufficient to effectively transmit intelligible radiation for useful distances. To overcome this problem multiple LEDs may be employed. Each additional LED increases the intensity of the transmitted radiation.

For connecting multiple infrared transceivers together, such as for a local area network (LAN) in an open office environment, acoustical ceiling tile makes an ideal diffuse infrared reflector. In a large open office environment, of the type using cubicle offices, the ideal illumination size on the diffuse infrared reflector is an area having maximum dimensions of eight to ten feet. Having an illuminated location of this size will allow for the inherent variations in illumination size which results from the relative location of each transceiver.

In a large open office it is preferable that the illumination location be somewhat centralized. For a single open office having more than one LAN two or more illumination spots are necessary. Clearly, each of these illumination spots cannot be in the center of the room. As infrared illumination is transmitted, the radiation beam will spread out as the distance increases. Thus, those transceivers positioned directly below the illumination location will project a relatively small spot and those transceivers positioned across the room will project a larger spot.

In a large room having cubicles, the angle of an incident radiation beam can become quite small. If the ceiling is twelve feet off the floor and transceiver is mounted on top of a five foot cubicle wall a beam projected from forty feet away forms an average angle of approximately ten degrees to the ceiling. If the LEDs are tightly clustered or in a vertical orientation in the transmitter the projected pattern becomes a long thin stripe on the ceiling. FIG. 1 shows an infrared transmitter 10 in a room 12 projecting an infrared signal at the ceiling. The transmitter 10 has a plurality of infrared LEDs positioned in a line. The orientation of the line of LEDs is essentially vertical. The illumination projection 14 is shown as a long stripe on the ceiling.

What is needed is a infrared transmitter which will transmit an infrared signal at relatively small projection angels and still maintain a small compact illumination location.

SUMMARY OF THE INVENTION

The present invention is for an illumination transmitter. The transmitter projects a signal onto a planar reflective surface such as the ceiling of an open office environment. The transmitter includes a plurality of illumination sources positioned in a line wherein the line has a predetermined orientation to the planar surface. The illumination sources are preferably infrared LEDs. The transmitter has means for jointly aiming the illumination sources toward a desired location on the planar surface. The location on the planar surface is usually used to allow multiple transmitters coupled to infrared receivers to allow communication between computers in a LAN. The transmitter also includes means for maintaining the predetermined orientation between the planar surface and the line. The orientation is usually parallel to allow transmitters located large distances from the illumination to project a relatively small illumination spot onto the planar surface.

BRIEF DESCRIPTION OF THE DRAWINGS

FIG. 3 shows a side view of the preferred embodiment of the present invention.

FIG. 4 shows a front view of the preferred embodiment of the present invention.

Like numbers for like elements are used in the various figures.

DETAILED DESCRIPTION OF THE PREFERRED EMBODIMENT

Figure 1:
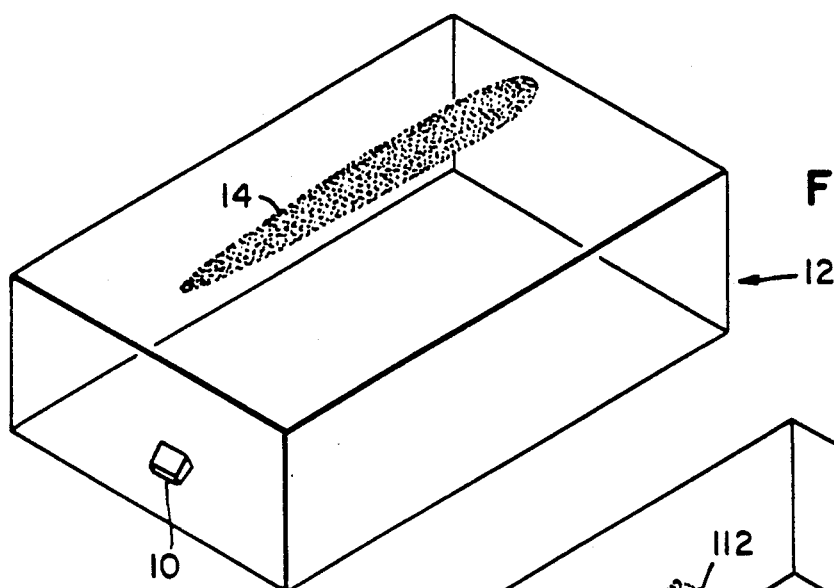
FIG. 1 shows an elevation view of the illumination projection produced where the orientation of a line of LEDs is vertical.
Figure 2A:
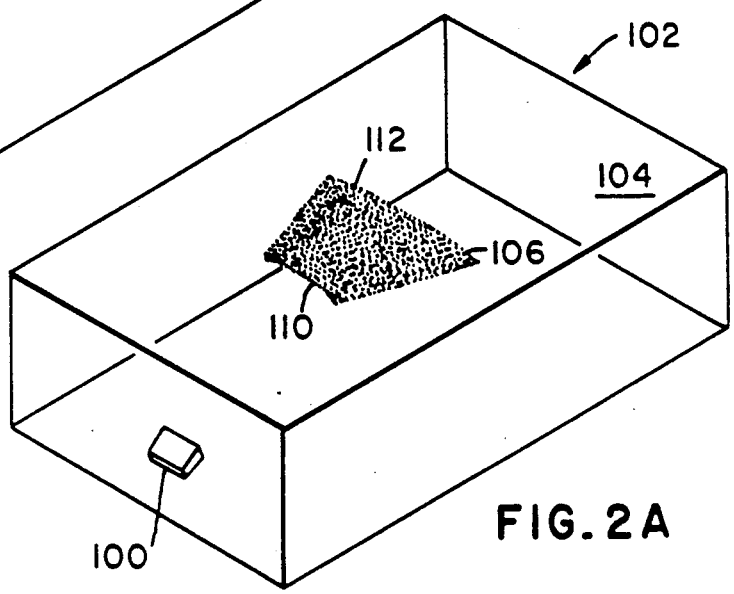
FIG. 2A shows an elevation view of the illumination projection produced according to the present invention.

FIG. 2A shows an elevation view of the illumination projection produced according to the preferred embodiment of the present invention. As will be described below, the LEDs in the transmitter 100 are positioned in a line and oriented horizontally, i.e. the line of the LEDs is parallel to the plane of the ceiling 104 of the room 102. The illumination projection 106 is approximately an isosceles trapezoid. The infrared receiver 101 is positioned to receive signal reflection from the illumination projection 106.

Figure 2B:
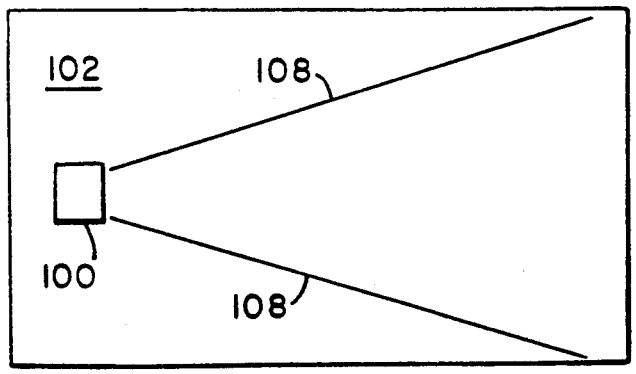
FIG. 2B shows a top view of the illumination projection produced according to the present invention.

FIG. 2B shows a top view of the illumination projection produced according to the present invention. The infrared radiation 108 transmitted from the transmitter 100 spreads out laterally in an amount proportional to the distance of the radiation from the transmitter 100.

Figure 2C:
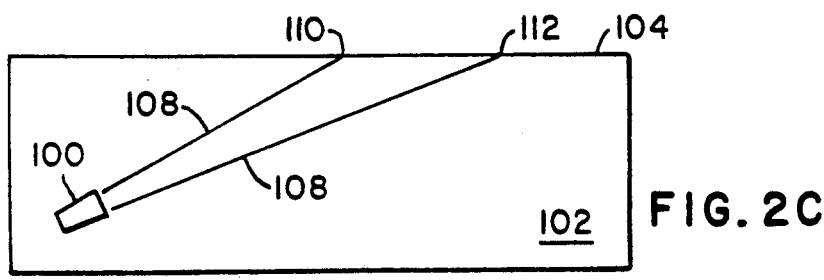
FIG. 2C shows a side view of the illumination projection produced according to the present invention.

FIG. 2C shows a side view of the illumination projection produced according to the present invention. The infrared radiation 108 transmitted from the transmitter 100 spreads out laterally in an amount proportional to the distance of the radiation from the transmitter 100. The infrared radiation 108 strikes the ceiling 104 some distance from the transmitter 100. The boundaries of the illumination parallel to the line of the LEDs are approximately parallel to the line of the lights. One parallel boundary 110 is closer to the transmitter 100 than the other parallel boundary 112. The other two boundaries of the illumination projection 106, shown in FIG. 2A, are closer together where they intersect the boundary 110 than where they intersect at the boundary 112.

In the preferred embodiment, lenses may be employed to develop an appropriate amount of spreading-out or expansion of the radiation beam. The optical lenses may also be used to collimate the beam. Appropriate lenses may be employed which expand the beam in one direction and collimate the beam in the other direction.

FIG. 3 shows a side view of the transmitter base 140 and the transmitter housing 180. As will be described below, the transmitter base 140 and the transmitter housing 180 can rotate relative to one another. Accordingly, the orientation between the transmitter base 140 and the transmitter housing 180 shown in FIG. 3 is arbitrary and can readily be changed.

In the preferred embodiment, the transmitter of FIG. 3 is a wireless link for up to four residents in a LAN. The residents can be personal computers, printers, modems and the like. The operation of the infrared link for such an application is discussed in sufficient detail to enable one of ordinary skill in the art to duplicate those results in our copending patent application Ser. No. 184,261. The transmitter base 140 contains the digital circuitry necessary to form network link. The transmitter housing 180 contains the analog circuitry to drive the infrared transmitter and the infrared receiver described in our copending application. By separating the analog and digital circuitry, these circuits can be separately grounded and electrically insulated from one another. Accordingly, unwanted cross-coupling between these circuits can be avoided.

The transmitter of the present invention is made to sit on a cubicle wall 142 of a typical open office environment divider. The digital circuit housing 144 is a positioned to be supported against one surface of the wall 142. Opposing the digital circuit housing 144 is a clamp 146. The clamp 146 may be tightened by a tightening screw 148 to draw the clamp 146 toward the digital circuit housing 144 and thereby tightly hold the wall 142 therebetween. The clamp 146 is also shown in a loose position by the dotted lined 146'.

The digital circuit housing 144 holds a LAN interface card and other digital circuitry. The interface card contains the necessary electronic components and integrated circuits to couple the transceiver to a resident of the network. In the preferred embodiment, four female connection jacks 150 are conveniently positioned along the bottom edge of the digital circuit housing 144. Each of these jacks 150 receives a male connector 152 coupled to an interface cable 154. The jacks 150 and the connectors 152 are preferably the standard four wire telephone type quick connectors. Each cable is connected to one of the network residents. The digital circuit housing 144 serves to hold the digital circuitry and to firmly hold the apparatus onto the wall 142.

A housing cross support 156 rests upon the wall 142. The cross support 156 is integral with the digital circuit housing 144. The cross support 156 and the digital circuit housing 144 are formed together at a right angle. The clamp 146 and its drive mechanism is slidably mounted within the cross support 156. The clamp is coupled to the tightening screw 148 through an internal threaded member 158. Once the tightening screw 148 is tightened, the digital circuit housing 144 and the clamp 146 are necessarily parallel to one another and the opposite faces of the wall 142. By allowing the cross support 156 to rest on the top of the wall 142 the cross support becomes locked into an orientation which is essentially parallel to the ceiling.

A circular flange 160 is positioned on top of the cross support 156. The flange receives a mating rotatable circular member 162. The rotatable member 162 is integrally coupled to the swing arm 164. The flange 160 and rotatable member 162 are joined together as a bearing to allow the swing arm 164 to rotate. As the swing arm 164 is rotated through all of its degrees of freedom any point on the swing arm 164 defines a circle parallel to the ceiling.

A tilt hinge 166 is positioned in the upper end of the swing arm 164. The tilt hinge 166 is also coupled to the transmitter housing 180. The transmitter housing 180 contains the transmitter LEDs 168 and photoreceiver 170. The photoreceiver can be a photodiode or phototransistor. In the preferred embodiment, the photoreceiver 170 is at the focal point of a parabolic reflector 172 to enhance the received infrared signal. The transmitter housing 180 contains the analog circuitry necessary to drive the LEDs 168, the photoreceiver 170 and to communicate with the digital circuitry contained in the digital circuit housing 144. The analog and digital circuitry are connected by any conventional means such as ribbon cable.

FIG. 4 shows a front view of the apparatus of the present invention. Each of the elements shown in FIG. 3 which also appears in FIG. 4 is given the same identifying reference numeral. In the preferred embodiment, eight LEDs 168 are used. The eight LEDs 168 are positioned in a line. The eight LEDs 168, photoreceiver 170 and the parabolic reflector 172 are positioned along one side of the transmitter housing 180 along with the analog circuit board 174 for ease of coupling these analog components together.

Figure 5A:
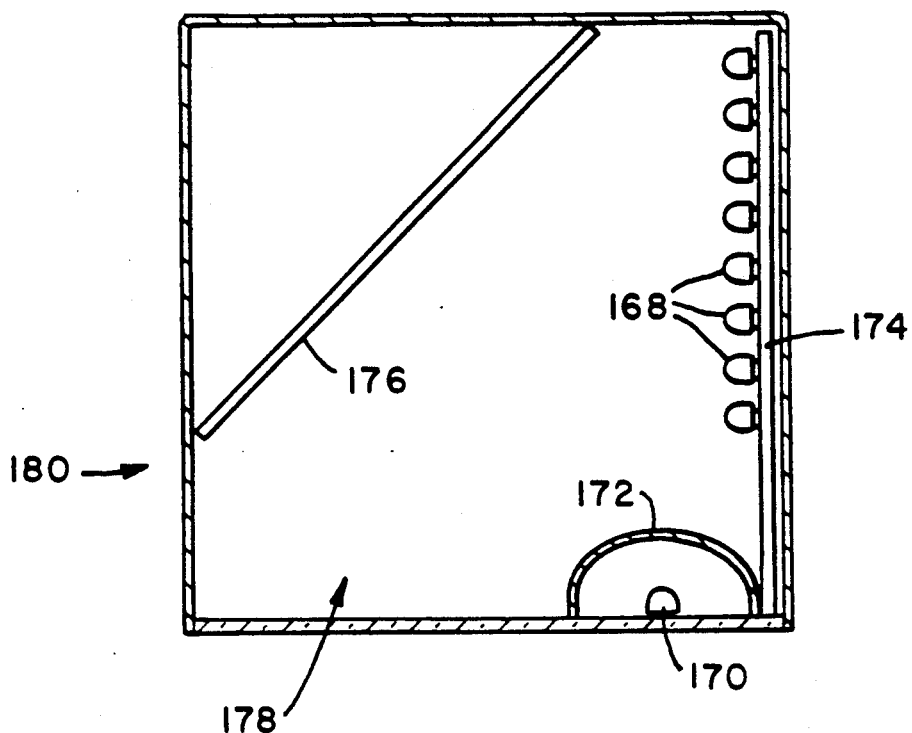
FIG. 5A shows a cross section top view of the preferred embodiment of the present invention.
Figure 5B:
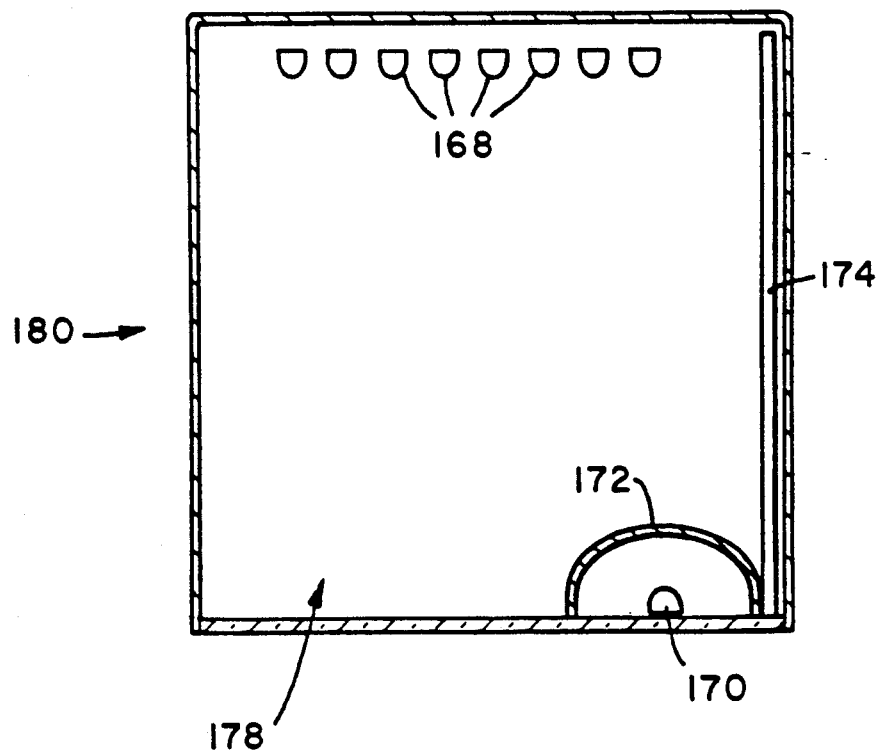
FIG. 5B shows a cross section top view of an alternate embodiment of the present invention.

It is preferable that the illuminated projection be approximately equal in all extents. The isosceles trapezoid described in reference to FIG. 2A is such an illuminated location. To achieve the isosceles trapezoid it is desireable that the line of illumination sources be parallel to the plane of the reflecting surface. Where the ceiling is used as the reflecting surface the line of the LEDs should be horizontal. The top cross section view of the transmitter housing 180 shows a mirror 176 oriented at a forty-five degree angle relative to the line of the LEDs and relative to the front opening 178 of the transmitter housing 180. Accordingly, the placement of the LEDs 168 is along a sidewall of the transmitter housing 180 to facilitate electronic connection it is equivalent to having the LEDs 168 positioned in a line across the back of the housing as shown in the alternate embodiment of FIG. 5B. Thus, whenever the line of LEDs is referred to in this patent document it will mean either the actual line of LEDs as in FIG. 5B or the virtual line of LEDs as in FIG. 5A.

The apparatus of the present invention maintains the line of LEDs in a horizontal orientation. The line of LEDs is a linear or quasi-linear radiation source. No matter which direction the transmitter housing 180 is rotated using the circular bearing of flange 160 and circular member 162 or what angle the transmitter housing 180 is tilted using the tilt hinge 166 the orientation of the LEDs relative to the plane of the ceiling remains the same. When the transceiver is properly mounted onto a wall 142, that orientation will always be horizontal.

An illumination transmitter is disclosed for projecting a radiated signal from a linear or quasilinear source onto a planar reflective surface wherein the source and the surface maintain the same orientation to one another. Modifications to the actual physical construction of the device which become obvious to one of ordinary skill in the art after reading this disclosure are deemed within the spirit and scope of this invention.

What is claimed is:

1. An illumination transmitter for projecting a signal onto a planar reflective surface comprising:
   a. a plurality of illumination sources positioned in a line having a substantially parallel orientation to the planar surface;
   b. means for jointly aiming the illumination sources at an acute angle toward a desired location on the planar surface while maintaining the substantially parallel orientation between the planar surface and the line so that a collective projection image is formed by the illumination sources on the planar surface which is substantially an isosceles trapezoid having a base and wherein the line is substantially parallel to the base.

2. The transmitter according to claim 1 wherein the signal is an infrared signal.

3. The transmitter according to claim 2 wherein the illumination sources are light emitting diodes.

4. The transmitter according to claim 1 further comprising a clamping means for mounting the transmitter to a wall.

5. The transmitter according to claim 4 wherein the clamping means also serves to house electronic circuitry.

6. The transmitter according to claim 1 wherein the means for aiming comprises a means for rotating the line about an axis which is normal to the planar surface and a means for tilting the line about its longitudinal axis.

7. The transmitter according to claim 6 wherein the means for rotating comprises a circular bearing.

8. The transmitter according to claim 6 wherein the means for tilting comprises a hinge.

9. An apparatus for transmitting information between components in a communication network within an enclosure having at least one diffuse planar reflection surface, comprising:
   a. a plurality of illumination sources arranged in a substantially linear arrangement;
   b. means for jointly aiming the sources at a location on the reflection surface, wherein the linear arrangement of the sources is maintained in a substantially parallel relationship to the planar surface, and wherein a beam emanating from the sources forms an acute angle with the reflection surface such that a projection image is formed on the reflection surface which is substantially an isosceles trapezoid; and
   c. at least one illumination receiver aimed at the location on the reflection surface.

* * * * *

UNITED STATES PATENT AND TRADEMARK OFFICE
CERTIFICATE OF CORRECTION

PATENT NO. : 5,191,461
DATED : March 2, 1993
INVENTOR(S) : Charles L. Crawshaw, et al It is certified that error appears in the above-indentified patent and that said Letters Patent is hereby corrected as shown below:

On the title page, in reference item [19], please delete "Cranshaw et al." and replace with --Crawshaw et al.--.

On the title page, in reference item [75], please delete "Cranshaw" and replace with "Crawshaw".

In column 2, Line 50, after the number "104" please delete "of" and replace with --or--.

In column 2, Line 53, please delete "reflection" and replace with --reflections--.

In column 3, Line 3, please delete "2A" and replace with --2B--.

In column 5, Line 4, please delete "quasilinear" and replace with --quasi-linear--.

UNITED STATES PATENT AND TRADEMARK OFFICE
CERTIFICATE OF CORRECTION

PATENT NO. : 5,191,461
DATED : March 2, 1993
INVENTOR(S) : Charles L. Crawshaw, et al It is certified that error appears in the above-indentified patent and that said Letters Patent is hereby corrected as shown below:

Column 5, line 4, delete "quasilinear" and replace with --quasi - linear--

This certificate supersedes Certificate of Correction issued July 26, 1994.

Signed and Sealed this

Twenty-sixth Day of July, 1994

Attest:

BRUCE LEHMAN

*Attesting Officer*     *Commissioner of Patents and Trademarks*